Sept. 25, 1962     D. SCARAMUCCI     3,055,632
LUBRICANT RECYCLING SYSTEM FOR VALVE OPERATING MECHANISM
Filed June 30, 1960

INVENTOR
DOMER SCARAMUCCI

BY Fred L. Witherspoon, Jr. &
Fred E. Shoemaker
ATTORNEYS

United States Patent Office 3,055,632
Patented Sept. 25, 1962

3,055,632
LUBRICANT RECYCLING SYSTEM FOR VALVE OPERATING MECHANISM
Domer Scaramucci, P.O. Box 9125, Oklahoma City, Okla.
Filed June 30, 1960, Ser. No. 40,036
6 Claims. (Cl. 251—266)

This invention relates to valves and more particularly to systems of and apparatus for lubricating the operating mechanisms of valves, which may be broadly classified as of the rising stem variety and deals primarily with systems and apparatus for lubricating the operating mechanisms for lifting valve stems by recycling a quantity of lubricant within the valve mechanism.

It is a general object of the present invention to provide a novel and improved lubricating system and apparatus for a rising stem type of valve operating mechanism.

More particularly it is an object of the invention to provide in a valve of the rising-stem type a lubricant and circulating means comprising two compartments, containing rubbing surfaces of the operating mechanism and alternately collapsible and expandable by valve stem movement from open to closed position and vice versa, together with transfer passages and ports whereby the lubricant is cycled from the collapsing compartment to the expanding one to insure maintaining all wearing surfaces continually coated therewith.

It is a further object of the invention to arrange in a valve having a rising stem for operating the control element thereof, as well as a secondary or screw stem which moves in the same direction as but at a lower rate than the main stem, means forming an integral part of the screw stem which serves to collapse one of the compartments used for the storage of lubricant and in which the rising main stem varies the size of the second compartment to effect the transfer of lubricant to and from respective compartments.

Other important objects and specific features of the present invention will be more apparent to those skilled in the art upon a consideration of the accompanying drawing and the following specification wherein is disclosed a single exemplary embodiment of the invention with the understanding that such variations, modifications and elimination of parts may be made therein as fall within the scope of the appended claims without departing from the spirit of the invention.

Figure 1:
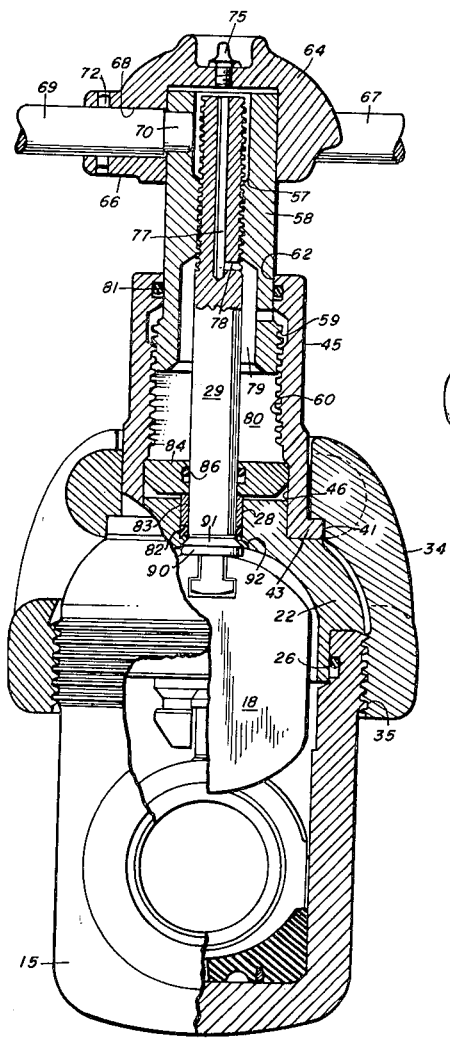
Figure 2:
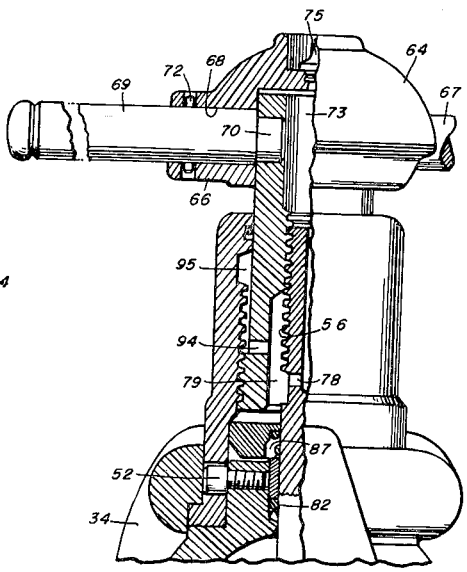

In said drawing:

FIGURE 1 is a transverse vertical section, partially in elevation through a gate type of "mud valve" shown in full open position; and FIGURE 2 is a partial vertical section through the upper portion of the valve operating mechanism shown in FIGURE 1.

Valves to control such abrasive laden fluids as well drilling "mud," at relatively high pressures, are commonly called "mud valves" and while they are not unique in using rising stems and secondary or screw stems they represent a type of valve subject to considerable abuse, first because of the requirement to operate to control abrasive laden fluids under excessively high pressures, under adverse conditions and remote from free access to frequent servicing. They are thus representative of valves which require adequate lubrication under all circumstances and function better and have a longer life if the operating portions of the mechanism are kept coated with a substantial covering of heavy duty grease.

The particular form of actual valving mechanism is unimportant and has no bearing on the present invention, it being only necessary for its proper performance that the valve be of the inside rising stem variety.

Referring now to the drawings, it will be seen that the valve illustrated for convenience is of the "gate" type and includes a body 15 providing a straight flow passage between end couplings, not shown. The mid portion of the flow passage is intersected by a valve insert assembly providing a slot for the passage of the gate 18 capable of shutting off the flow between the two couplings. The valve insert assembly is held in position in the valve body 15 by bonnet 22 having a cylindrical lower portion received in a counterbore in the valve body coaxial with the chamber which receives the insert. The counterbore is provided with a circumferential channel or groove in which is received an O-ring 26 serving to effect a fluid-tight seal between valve body 15 and bonnet 22, which latter is closed at the top except for a coaxial bore for the passage of valve stem 29 which serves to raise and lower gate 18 attached thereto by a rotatable connection.

FIGURE 1 shows the gate in the open position and FIGURE 2 illustrates the operating mechanism adjusted for holding the valve in the closed position. The bonnet is secured on the housing by means of coupling element 34 internally threaded to engage over the external threads 35 on the housing spigot. The coupling comprises upper and lower rings connected by circumferentially spaced verticals. The upper ring is counterbored at 41 providing a shoulder to engage over the radial flange 43 at the lower end of screw housing 45, which is internally and coaxially bored at 46 to engage over a cylindrical upward extension of the bonnet, whose reduced diameter produces an annular shoulder against which flange 43 is forced downwardly under the pull of the coupling 34 when it is tightened down. To prevent relative rotation between the screw housing 45 and the bonnet, the telescoping portions thereof are attached together by means of one or more indexing screws 52, FIGURE 2, the shanks of which are threaded into radial openings in the neck of the bonnet near its upper end while the heads are received in loosely fitting radial bores in the screw housing just above the flange thereon.

To provide for raising and lowering the gate the upper end of stem 29 is threaded at 56, to co-operate with threads 57 in the upper portion of the bore of screw stem 58, the latter being a tubular member having an enlarged diameter at its lower end with external threads 59 co-operating with internal threads 60 in the screw housing 45.

Thus, when the screw stem is rotated by mechanism later to be described, movement of the valve stem is twice as rapid as would result from the single thread on the latter, which is of the same pitch as the thread of the housing. Thus rotation of screw stem 58 from the position shown in FIGURE 2 to that shown in FIGURE 1 moves it the distance afforded it by its threaded relation to the screw housing 45 while at the same time moving the stem 29 in relation to the screw stem the amount afforded by the relative rotation between these two parts and the pitch of their threads, which produces a rapidly rising or lowering stem and does not require so much manipulation of the operating handles.

The screw stem 58 when in its lowermost position protrudes considerably above the upper end of screw housing 45, in which it is closely guided by the walls of bore 62 therein, in order to receive the hand wheel hub 64 concentrically bored to have a close fit over the upper end of the screw. The hub is provided with a plurality of radial, integral arms 66 preferably three in number, two being adapted to permanently receive radial spokes 67 which may be threaded or otherwise rigidly secured therein, and the third of which is drilled radially as at 68 to provide a close fit for the spoke 69 which is removable from this bore and has on its inner end a tenon 70 adapted to be received closely in a bore in the screw stem to lock the hand wheel hub thereto for rotation therewith. The removable spoke 69 is adapted to be locked in position in the hand wheel by means of spring pin 72 extending through aligned bores in the handle and in the spoke.

The hand wheel hub fits tightly on the screw stem and closes the large compartment 73 in its upper end, coaxial with and of greater diameter than the threads for the upper end of the stem. A well in this closure houses grease nipple 75 adapted to receive a grease gun for lubricating the operating mechanism of the valve stem by delivery first into compartment 73. For the purpose of distributing this grease which may be supplied when the gate is either opened or closed the compartment 73 connects directly with axial bore 77 opening through the upper end of stem 29 and connected at its lower end to the outer surface of this stem by radial passage 78, which in the most elevated position of the stem still opens into the enlarged coaxial chamber 79 at the lower end of the screw stem and which is in open engagement with the compartment 80 in the screw housing.

Should the grease be supplied through the nipple 75 when valve gate 18 is closed, it will pass into and fill chamber 73, at the upper end of the screw stem, pass through and fill the central bore 77 in the valve stem, pass out through the radial passage 78, and fill the concentric chamber 79 at the lower end of the screw stem. Should the valve now be opened, the stem rising in chamber 73 in the upper end of the screw stem displaces a large portion of the grease therein forcing it down through central bore 77, out through radial passage 78 into chamber 79 and as screw stem 58 rises the grease moves from 79 into a now enlarging chamber 80, seen in FIGURE 1, below the lower end of the screw housing. Thus the grease is transferred from one compartment which is being constricted to another which is being enlarged in whatever direction the valve stem may be moving and is, thus, continually distributed over all surfaces requiring lubricating, but it is not squeezed out so that substantially the total quantity is preserved no matter how many times the valves may be operated and is always in a position to be effective to reduce friction and the amount of effort necessary to operate the valve.

It will be noted that leakage of grease between the rising and lowering screw stem and the screw housing is prevented by the O-ring 81 in an undercut channel near the upper end of the housing. The valve stem is protected against valve-controlled fluid leakage longitudinally thereof and thence through the bore 28 by means of a circumferential packing 82 having a V-groove at its lower end whereby pressure expands the lips against the walls of the counterbore in which this packing is fitted and against the valve stem. The packing is held down by metal bushing 83 which guides the stem and whose upper end is engaged by washer 84, which fits against the wall of the same counterbore in the screw housing as is received over the upper extension of the bonnet.

This washer is prevented from rising as shown and is bored for the passage of the valve stem and provided with an internal circumferential groove to receive the secondary stem packing 86 in the form of an O-ring. Since this packing is hardly capable of withstanding the total pressure of the fluid flowing through the valve, should the latter leak through the primary stem packing 82 due to wear or defect therein, any such leakage will be handled by means of the bore 87 parallel to the stem bore in the washer and extending from the groove holding O-ring toward the lower face which is spaced above the projection over which the lower end of the screw housing fits so that fluid may move out radially in this space and then through one or more of the bores for the heads of the indexing screws 52 and thus to the outside, where it does no damage.

As a means for protecting both of the previously described stem seals, when the valve is opened, the stem 29 has formed thereon just above the gate 18 an enlargement 90 extending circumferentially thereabout and having the chamfered upper edge 91 adapted to seat in a correspondingly shaped countersink 92 at the lower end of the stem bore in the bonnet. The metal-to-metal seal occurring when the stem is lifted until the enlargement 90 fits tightly in the countersink will relieve the pressure on both the main and secondary stem seals by keeping valved fluid away from them.

The radial bore 94 through the wall of the screw stem below the inner threads and above the outer threads thereon permits a quantity of grease to be delivered to and from the varying sized secondary chamber 95 above the threads in the screw housing 45 to insure lubrication of its walls and those adjacent thereto.

I claim:

1. In a gate valve of the rising stem type in combination, a valve housing, a valve stem having a threaded upper end, a longitudinal passage in said stem for approximately the length of the thread, open at the upper end and connected at the lower end to the screw stem surface, a stem having a central bore and end counterbores, the section between counterbores being threaded to engage the stem threads, the screw stem being externally cylindrical with a raised screw thread at its lower end only, a screw housing closed by and fixed at its lower end to the valve housing, an internal thread intermediate the ends of said housing and engaging the external thread on said screw stem, a radial bore thru the screw stem above its external and below its internal threads, a packing at the top of the housing making fluid tight engagement with the exterior of said screw stem, means closing the upper end of said screw stem, and means to supply grease to the chamber in the upper end of said screw stem, said stem passage and screw stem bore providing for grease migration without substantial loss as the stem is raised and lowered in the screw stem and the latter in the screw housing.

2. In a rising stem type valve, in combination, a valve housing, a bonnet on said housing, a threaded valve stem passing through said housing, a longitudinal bore in said stem from the outer end to a lateral passage below the threads, a screw stem threaded to engage said stem and having closed lubricant holding chambers above and below its threads connected by said passage and bore, a screw housing mounted on said bonnet, interengaging threads on said screw housing and screw stem, and means to rotate said screw stem to raise and lower said screw stem and valve stem, such movements enlarging one closed chamber and contracting the other and vice-versa to transfer lubricant from one to the other.

3. A lubricating system for a rising stem type valve, having a valve housing and a bonnet on said housing, the combination of a threaded valve stem passing through said bonnet, a screw stem threaded to engage said valve stem and having closed chambers above and below its threads, a lubricant in said closed chambers, channel means connecting said chambers for passage of lubricant therethrough, and means to rotate said screw stem to raise and lower said valve stem, such movement enlarging one closed chamber and contracting the other and vice-versa to transfer lubricant from one chamber to the other.

4. A lubricating system for a rising stem type valve having a valve housing and a bonnet on said housing, comprising a screw housing connected to and extending upwardly from said bonnet, a screw stem threadedly engaging within said screw housing forming a closed chamber in said screw housing, a valve stem threadedly engaged in said screw stem and carrying a valving member for movement between open and closed positions, the upper portion of said screw stem being counterbored, means closing the upper end of said screw stem forming a closed chamber in said upper end thereof, said valve stem extending into said last mentioned closed chamber when the valving member is in open position, channel means connecting said closed chambers, a lubricant in said closed chambers, and means for rotating said screw stem to raise and lower said valve stem, such movement enlarging one closed chamber and contracting the other and vice-versa to transfer lubricant from one chamber to the other upon movement of said valve stem.

5. A lubricating system for a rising stem type valve having a valve housing and a bonnet on said housing, a valve member movable between open and closed positions, an internally threaded screw housing connected to and extending upwardly from said bonnet, a tubular screw stem threadedly engaging within said screw housing and forming a closed chamber in said housing, a valve stem carrying said valve member and threadedly engaged in said screw stem, the upper portion of said screw stem being counterbored, means closing the upper end of said screw stem to form a closed chamber therein, said valve stem extending into said closed chamber when the valve member is in open position, said valve stem having an axial bore connecting with the closed chamber in the screw stem and being connected by a transverse passage to the closed chamber in said tubular member, a lubricant in said closed chambers, and means for rotating said screw stem to raise and lower said valve stem, such movement enlarging one closed chamber and contracting the other end and vice-versa to transfer lubricant from one chamber to the other upon movement of said valve stem.

6. In a gate valve, in combination, a valve gate, a stem for lifting and lowering the gate, a bonnet having a bore for said stem and pressurized on the interior, a stem actuating system above said bonnet having a housing secured to said bonnet, a plurality of connected chambers in and associated with said housing, a quantity of lubricant in said system and chambers, a primary stem seal in said bonnet bore, a bushing above said seal closing one of the lubricant chambers in said housing, a secondary stem seal in said bushing and means venting the space between said primary and secondary stem seals to atmosphere to prevent damage to the secondary seal and contamination of the lubricant by pressurized fluid on leakage of the primary seal.

References Cited in the file of this patent
UNITED STATES PATENTS

| | | |
|---|---|---|
| 1,453,532 | Stevens | May 1, 1923 |
| 2,834,097 | Eichenberg | May 13, 1958 |

Notice of Adverse Decision in Interference

In Interference No. 93,648 involving Patent No. 3,055,632, D. Scaramucci, Lubricant recycling system for valve operating mechanism, final judgment adverse to the patentee was rendered Dec. 4, 1964, as to claim 4.

[*Official Gazette January 19, 1965.*]

Disclaimer 3,055,632.—*Domer Scaramucci*, Oklahoma City, Okla. LUBRICANT RE-
CYCLING SYSTEM FOR VALVE OPERATING MECHANISM.
Patent dated Sept. 25, 1962. Disclaimer filed Mar. 3, 1965, by the
inventor.
Hereby enters this disclaimer to claim 4 of said patent.
[*Official Gazette June 15, 1965.*]